(12) United States Patent
Fang et al.

(10) Patent No.: US 9,980,228 B2
(45) Date of Patent: May 22, 2018

(54) LOW-POWER WAKE-UP PACKET GENERATION

(71) Applicant: Intel Corporation, Santa Clara, CA (US)

(72) Inventors: Juan Fang, Hillsboro, OR (US); Shahrnaz Azizi, Cupertino, CA (US); Minyoung Park, Portland, OR (US); Thomas J. Kenney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 15/279,324

(22) Filed: Sep. 28, 2016

(65) Prior Publication Data

US 2018/0092035 A1 Mar. 29, 2018

(51) Int. Cl.
*H04J 11/00* (2006.01)
*H04W 52/02* (2009.01)
*H04W 84/12* (2009.01)

(52) U.S. Cl.
CPC ......... *H04W 52/0229* (2013.01); *H04J 11/00* (2013.01); *H04J 11/0066* (2013.01); *H04J 2011/0013* (2013.01); *H04W 84/12* (2013.01)

(58) Field of Classification Search
CPC ...... H04L 5/0007; H04L 27/206; H04J 11/00; H04J 3/00; H04J 7/00; H04J 3/045; H04B 14/023; H04Q 2213/1303; H04Q 2213/036; H04Q 2213/13036; H04N 21/4341
USPC ........ 370/208, 203, 532, 533, 534, 535, 537
See application file for complete search history.

(56) References Cited

U.S. PATENT DOCUMENTS

| | | | | |
|---|---|---|---|---|
| 9,749,958 | B1 * | 8/2017 | Segev | H04W 52/0235 |
| 9,848,385 | B2 * | 12/2017 | Park | H04W 52/0235 |
| 2017/0280498 | A1 * | 9/2017 | Min | H04L 5/0007 |

* cited by examiner

*Primary Examiner* — Brenda H Pham
(74) *Attorney, Agent, or Firm* — Schwegman Lundberg & Woessner, P.A.

(57) ABSTRACT

Embodiments of low-power wake-up packet generation are generally described herein. A wireless device modulates an LP-WUR (low-power wake-up radio) bit sequence with an LP-WUR pulse to obtain a plurality of modulated LP-WUR signals, each modulated LP-WUR signal having a 1× symbol duration. The wireless device multiplexes, in a time domain, an OFDMA (orthogonal frequency division multiple access) signal with a 4× symbol duration with four modulated LP-WUR signals, to generate a multiplexed signal. The wireless device encodes for transmission of the multiplexed signal to a peer device to wake up a WLAN (wireless local area network) radio of the peer device and to another device with an OFDMA signal.

20 Claims, 7 Drawing Sheets

LOW-POWER WAKE-UP PACKET GENERATION

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group. Some embodiments relate to a low-power wake-up radio (LP-WUR). Some embodiments relate to low-power wake-up packet generation.

BACKGROUND

In recent years, applications have been developed relating to social networking, Internet of Things (IoT), wireless docking, and the like. It may be desirable to design low power solutions that can be always-on. However, constantly providing power to a wireless local area network (WLAN) radio may be expensive in terms of battery life.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
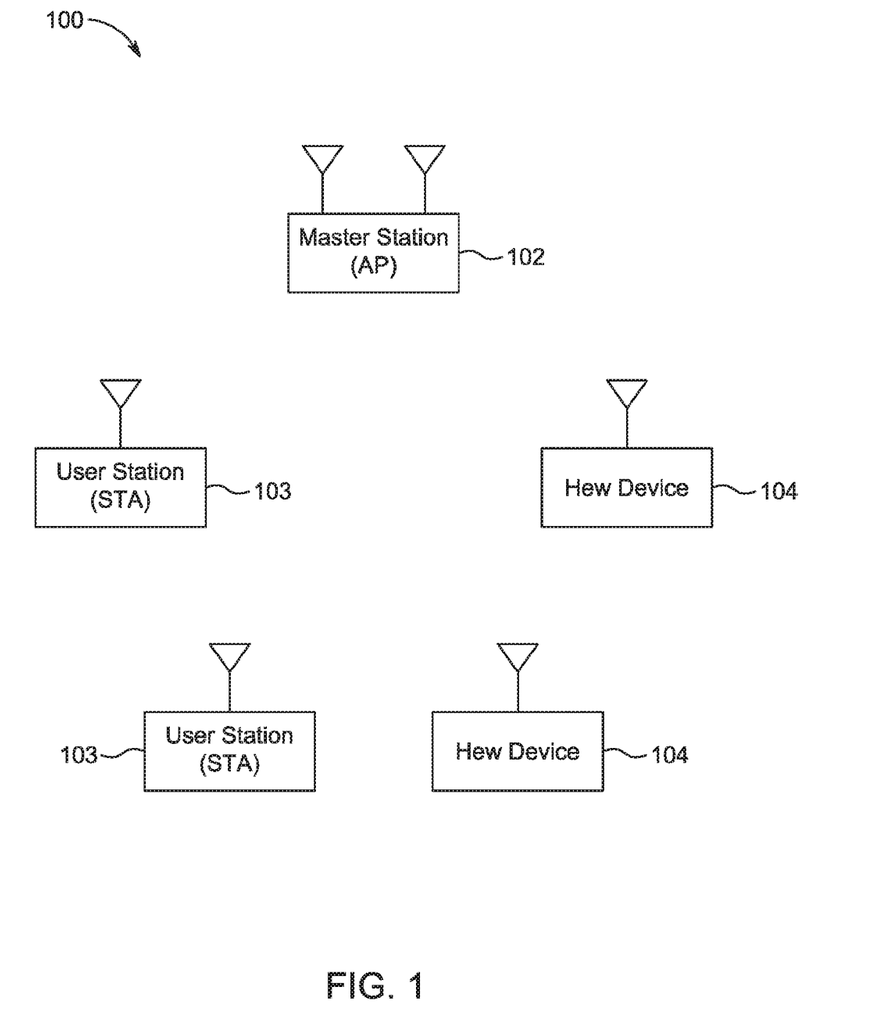
FIG. 1 illustrates a wireless network, in accordance with some embodiments.

FIG. 1 illustrates a wireless network in accordance with some embodiments. In some embodiments, the network 100 may be a High Efficiency Wireless (HEW) Local Area Network (LAN) network. In some embodiments, the network 100 may be a Wireless Local Area Network (WLAN) or a Wi-Fi network. These embodiments are not limiting, however, as some embodiments of the network 100 may include a combination of such networks. That is, the network 100 may support HEW devices in some cases, non HEW devices in some cases, and a combination of HEW devices and non HEW devices in some cases. Accordingly, it is understood that although techniques described herein may refer to either a non HEW device or to an HEW device, such techniques may be applicable to both non HEW devices and HEW devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HEW devices 104. In some embodiments, the AP 102 may transmit a trigger frame (TF) to an STA 103 to indicate that the STA 103 is to perform an uplink data transmission to the AP. In some embodiments, the AP 102 may transmit downlink data packets to the STA 103, and the STA 103 may transmit a block acknowledgement (BA) message for the downlink data packets. These embodiments will be described in more detail below.

The AP 102 may be arranged to communicate with one or more of the components shown in FIG. 1 in accordance with one or more IEEE 802.11 standards (including 802.11ax and/or others), other standards and/or other communication protocols. It should be noted that embodiments are not limited to usage of an AP 102. References herein to the AP 102 are not limiting and references herein to the master station 102 are also not limiting. In some embodiments, a STA 103, HEW device 104 and/or other device may be configurable to operate as a master station. Accordingly, in such embodiments, operations that may be performed by the AP 102 as described herein may be performed by the STA 103, HEW device 104 and/or other device that is configurable to operate as the master station.

In some embodiments, one or more of the STAs 103 may be legacy stations. These embodiments are not limiting, however, as the STAs 103 may be configured to operate as HEW devices 104 or may support HEW operation in some embodiments. The master station 102 may be arranged to communicate with the STAs 103 and/or the HEW stations 104 in accordance with one or more of the IEEE 802.11 standards, including 802.11ax and/or others. In accordance with some HEW embodiments, an access point (AP) may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, STAs 103 not operating as HEW devices may refrain from communicating in some cases. In some embodiments, the master-sync transmission may be referred to as a control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement.

In some embodiments, the HEW communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of an HEW communication may be configured for transmitting a number of spatial streams.

In some embodiments, high-efficiency wireless (HEW) techniques may be used, although the scope of embodiments is not limited in this respect. As an example, techniques included in 802.11ax standards and/or other standards may be used. In accordance with some embodiments, a master station 102 and/or HEW stations 104 may generate an HEW packet in accordance with a short preamble format or a long preamble format. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
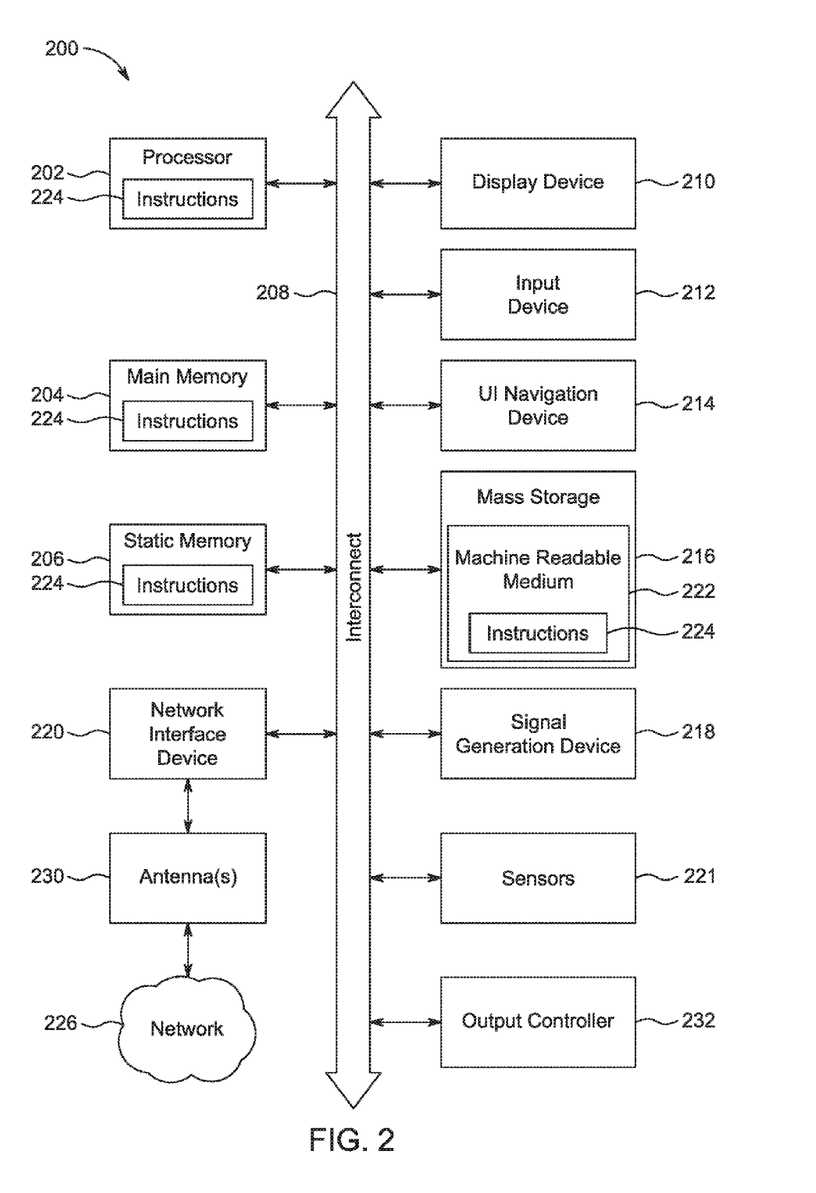
FIG. 2 illustrates an example machine, in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, HEW device, HEW AP, HEW STA, UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
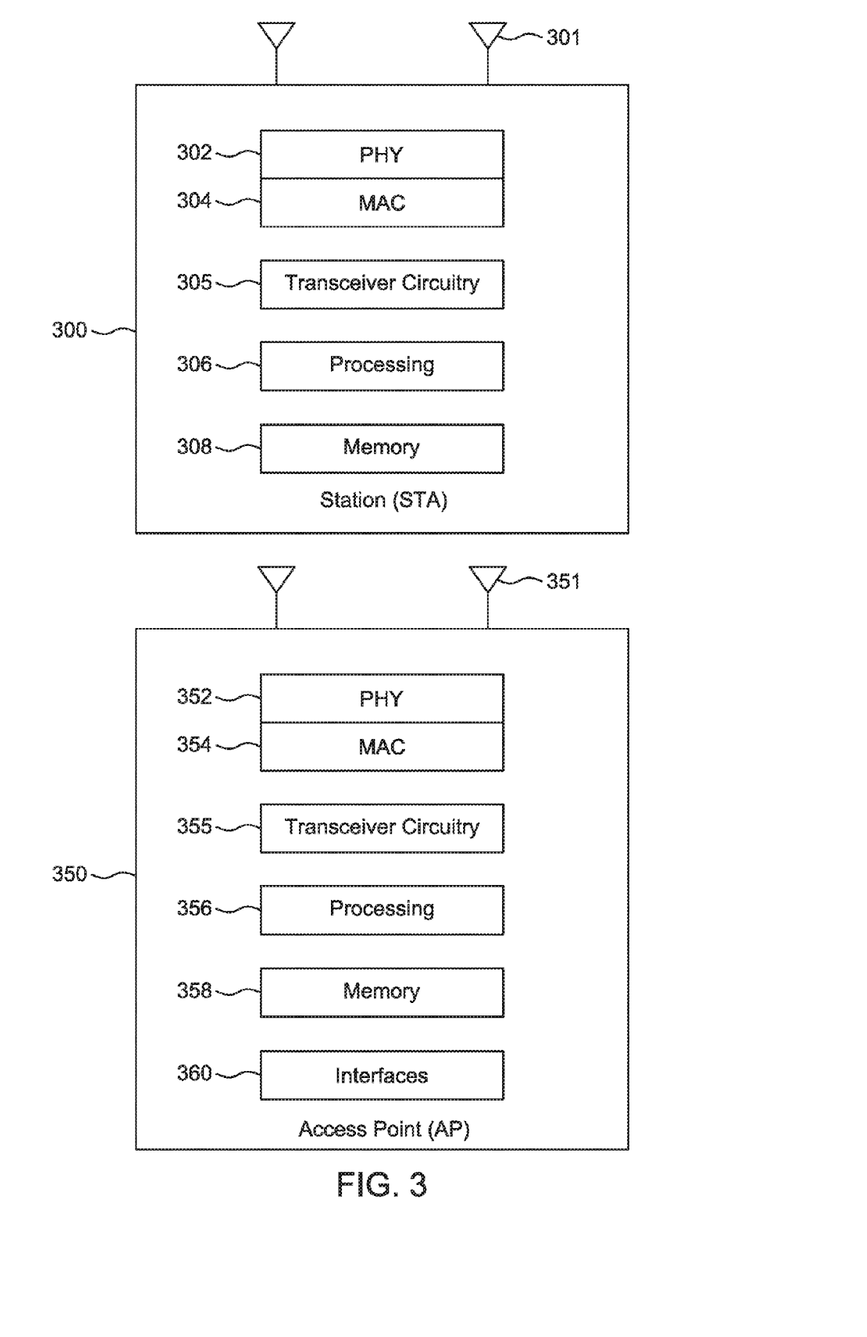
FIG. 3 illustrates a station (STA) in accordance with some embodiments and an access point (AP), in accordance with some embodiments.

FIG. 3 illustrates a station (STA) in accordance with some embodiments and an access point (AP) in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control layer (MAC) circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control layer (MAC) circuitry 354 for controlling access to the wireless medium.

The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured as an HEW device 104 (FIG. 1), and may communicate using OFDM and/or OFDMA communication signals over a multicarrier communication channel. In some embodiments, the AP 350 may be configured to communicate using OFDM and/or OFDMA communication signals over a multicarrier communication channel. In some embodiments, the HEW device 104 may be configured to communicate using OFDM communication signals over a multicarrier communication channel. Accordingly, in some cases, the STA 300, AP 350 and/or HEW device 104 may be configured to receive signals in accordance with specific communication standards, such as the Institute of Electrical and Electronics Engineers (IEEE) standards including IEEE 802.11-2012, 802.11n-2009 and/or 802.11 ac-2013 standards and/or proposed specifications for WLANs including proposed HEW standards, although the scope of the embodiments is not limited in this respect as they may also be suitable to transmit and/or receive communications in accordance with other techniques and standards. In some other embodiments, the AP 350, HEW device 104 and/or the STA 300 configured as an HEW device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect. Embodiments disclosed herein provide two preamble formats for High Efficiency (HE) Wireless LAN standards specification that is under development in the IEEE Task Group 11ax (TGax).

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

A wake-up packet may be transmitted from a STA to an AP or from an AP to a STA to cause the receiver to wake up its WLAN radio. Aspects of the subject technology relate to the low-power wake-up radio (LP-WUR) architecture for orthogonal frequency division multiplexing (OFDM) based Wi-Fi systems. The LP-WUR provides a low-power solution (e.g., approximately 100 µW in active state) for always-on Wi-Fi (or Bluetooth®) connectivity of wearable, IoT (Internet of Things) and other emerging devices that may be densely deployed and used. One design of LP-WUR is based on the legacy 802.11a/g/n/ac specification by the Institute of Electrical and Electronics Engineers, which utilized a 4 microsecond OFDM symbol duration.

As disclosed herein, a wake-up packet may be transmitted in an 11ax orthogonal frequency division multiple access (OFDMA) sub-channel. A wake-up pulse (WU-pulse) may be constructed to utilize the 4× symbol duration of 11ax. Aspects of the subject technology are directed to construction of the wake-up pulse for the LP-WUR which is compatible with 11ax OFDMA structure. One approach is to maintain the 1× symbol duration time to reduce the overall transmission time of the wake-up packet as well as reducing interference to OFDMA signals in other resource units (RUs).

According to some implementations, the subject technology uses a 1× symbol duration (1×Sym) pulse (e.g. 4 microseconds) providing low out of band emission compared to a 4× symbol duration (4×Sym) pulse (e.g. 16 microseconds) for operation of LP-WUR in 11ax BSS (base station subsystem). Using a pulse with a 1× symbol length drastically reduces the transmission time of the LP-WUR signal. Additionally, the low out of band emission (OOBE) of the pulse minimizes the interference to OFDMA signal in other resource units. One improvement provided by the subject technology is that the interference to other OFDMA signals in other resource units is lower than in some other schemes.

11ax has 4× symbol duration with the smallest OFDMA RU of a 26-tone. For LP-WUR pulses to be multiplexed with the 11ax OFDMA waveform and to be assigned to the smallest RU of 26-tone, it needs a 4× symbol duration to maintain orthogonality with other OFDMA signals in other RUs. To generate the WU-pulse with a 1× symbol duration and almost the same bandwidth as one RU with 26-tone, we modify the existing LP (low-power) WU-pulse to fill one OFDMA RU allocation.

The existing LP WU-pulse for OFDM-based Wi-Fi systems is based on the 802.11a STF (short training field) with the zero tones removed from that signal and is set forth in Equation 1.

$$s = \sqrt{\frac{13}{6}} * [1+1i, -1-1i, 1+1i, -1-1i, -1-1i, 1+1i,$$
$$0, -1-1i, -1-1i, 1+1i, 1+1i, 1+1i, 1+1i] \quad \text{Equation 1}$$

To meet the 11ax 26-tone bandwidth, some aspects of the subject technology consider only half of the tones in the sequence of Equation 1 in order to reduce the bandwidth form 4.06 MHz to 2.1875 MHz. This results in 7 tones, as set forth in Equation 2.

$$s\_ax = \alpha * [-1-1i, -1-1i, 1+1i, 0, -1-1i, -1-1i, 1+1i] \quad \text{Equation 2}$$

In Equation 2, $\alpha$, as a scaling factor, is used to normalize the power per RU or per entire bandwidth based on the 11ax specification. For example, $\alpha$ is set to sqrt (13/6) [where sqrt represents the square root function] if the power is normalized per RU. A 64-point IFFT (inverse fast Fourier transform) of s_ax creates a 3.2 microsecond time domain sequence, p_wur, which has the same pulse duration as the existing LP WU-pulse.

Figure 4:
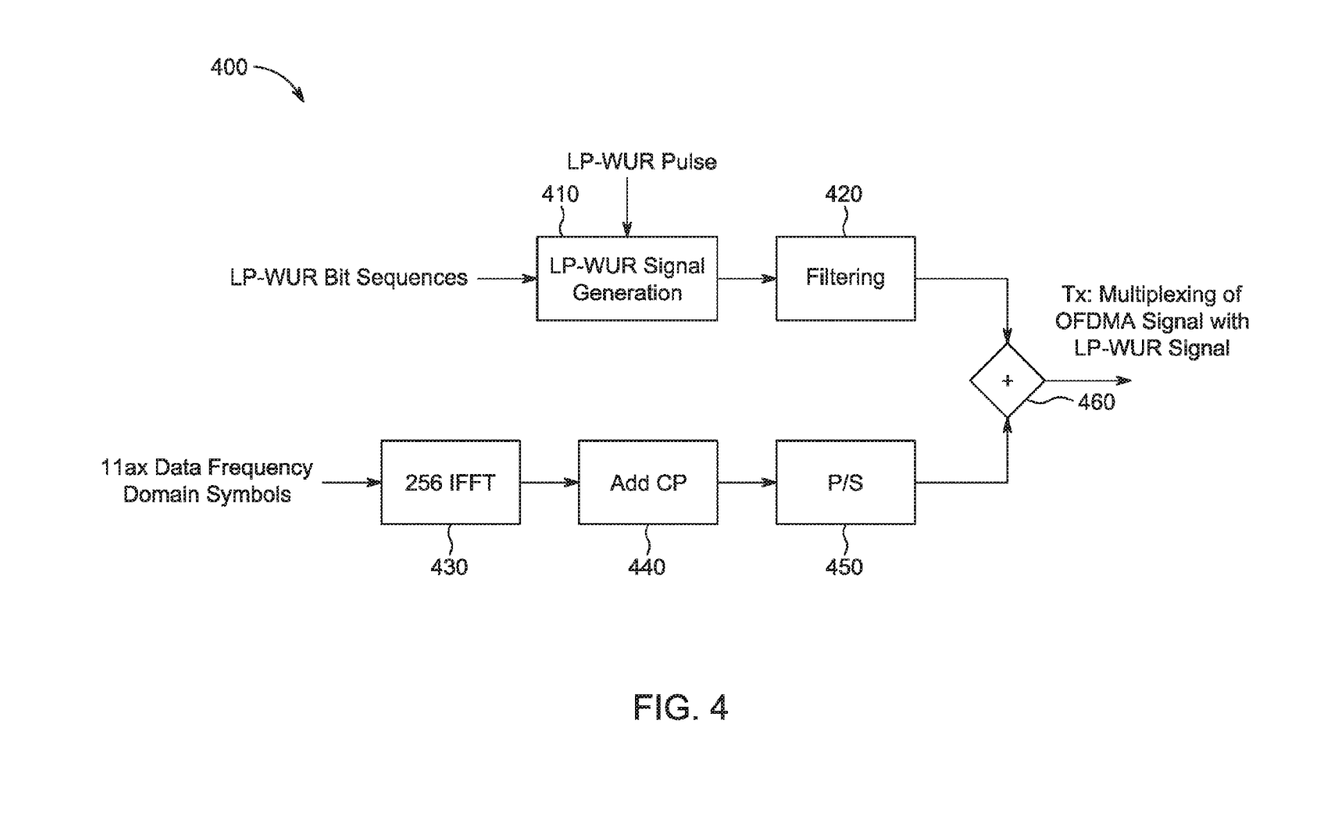
FIG. 4 illustrates an example data flow for multiplexing an OFDMA (Orthogonal Frequency Division Multiple Access) signal with a LP-WUR (low-power wake-up radio) signal, in accordance with some embodiments.

However, an LP-WUR signal generated by this LP WUR-pulse, p_wur, is no longer orthogonal with the OFDMA signal in other RUs. Thus, it causes interference to the OFDMA signals in adjacent RUs. To reduce the interference from the LP-WUR signal to the OFDMA signals, some aspects of the subject technology use the LP WUR-pulse with low out of band emission to generate the LP-WUR signal. This modified pulse is obtained by point-to-point multiplication of the existing pulse, p_wur, with a windowing function or convolving it with a filter (or other alternative methods) to reduce the out of band emission of the pulse. FIG. 4 illustrates how to multiplex the LP-WUR signal with 1×Sym duration with the OFDMA signal with a 4×Sym duration.

FIG. 4 illustrates an example data flow 400 for multiplexing an OFDMA signal with a LP-WUR signal.

At block 410, LP-WUR bit sequences and an LP-WUR pulse are provided for LP-WUR signal generation. In some cases, the LP-WUR pulse has low OOBE.

At block 420, the generated LP-WUR signal is filtered. The output of the block 420 is provided to the block 460. In some examples, the data flow 400 may be implemented without the block 420, and the generated LP-WUR signal may be provided directly to the block 460.

At block 430, 11ax data frequency domain symbols are provided for a 256 IFFT. At block 440, a cyclic prefix (CP) is added to the output of the 256 IFFT. In some cases, the CP is not added and block 440 is skipped. At block 450 P/S (parallel to serial) conversion is applied to the output from block 440 (or block 430 if block 440 is skipped). The output of block 450 is provided to block 460.

At block 460, the OFDMA signal from block 450 is multiplexed with the generated LP-WUR signal from block 420. The output of block 460 is encoded for transmission.

In some examples, a CP length is defined to be 0.8 microseconds. The modified pulse, p_wur_m, is obtained by point-to-point multiplication of the existing 2 MHz pulse with a window function (win_fun), as shown in Equation 3.

$$p\_wur\_m = p\_wur.*win\_fun;$$

where $$win\_fun(1:4) = [1/8, 3/8, 5/8, 7/8];$$

$$win\_fun(5:end-4) = 1;$$

$$win\_fun(end-3:end) = [7/8, 5/8, 3/8, 1/8]. \quad \text{Equation 3}$$

In accordance with some implementations of the subject technology described above, outbound emissions from a packet are reduced. As a result, interference from the LP-WUR signal to OFDM signals is reduced.

The WUR pulse is generated by selecting a frequency domain sequence according to Equation 2, above. In addition, the frequency domain sequence, P_freq, of the WUR pulse is defined according to Equation 4.

$$P\_freq = zeros(1, 64)$$

$$P\_freq(-3:3) = s\_ax \quad \text{Equation 4}$$

A 64 point IFFT is used to get the time domain pulse, as shown in Equation 5, where p_wur1 is the time domain WUR pulse without the CP.

$$p\_wur1 = IFFT(P\_freq, 64) \quad \text{Equation 5}$$

The CP is added according to Equation 6, where p_wur is the WUR pulse with CP and 16 is the CP length.

$$p\_wur = [p\_wur1(64-16+1:64), p\_wur1] \quad \text{Equation 6}$$

Figure 5:
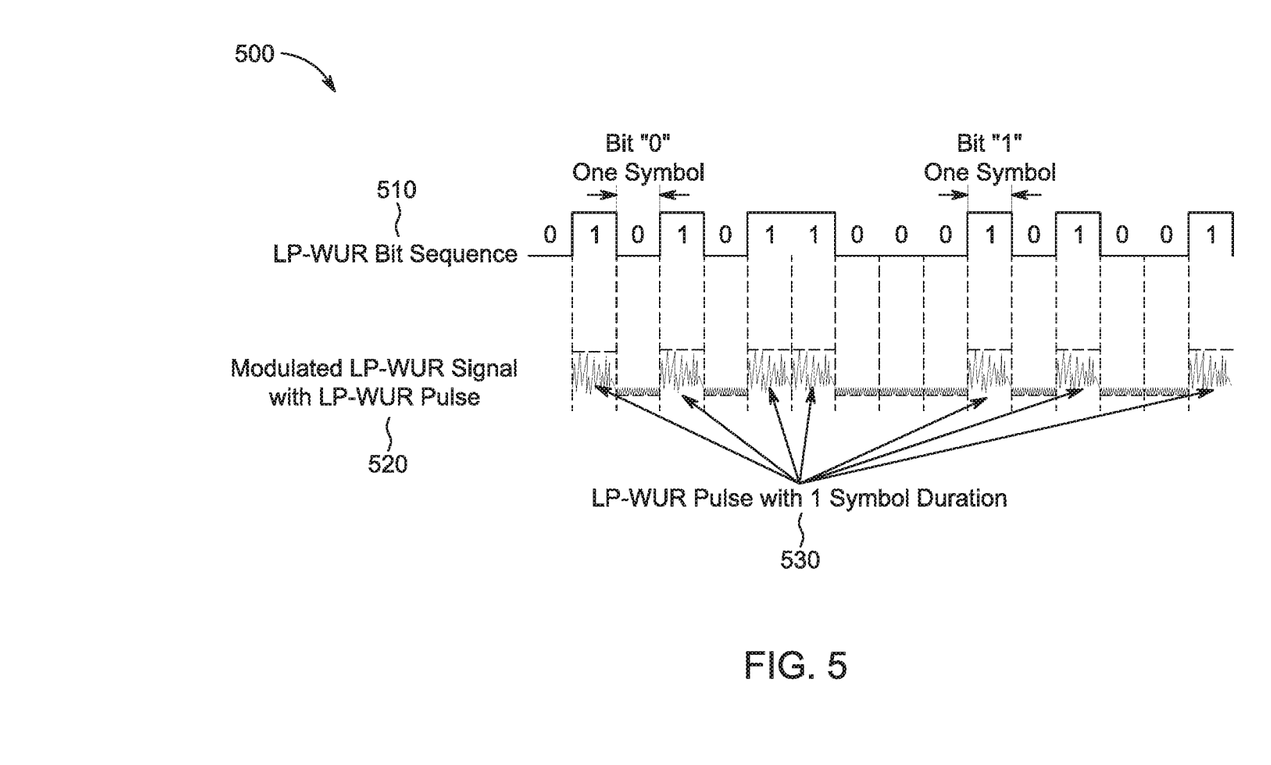
FIG. 5 is a graphical representation of generation of a modulated LP-WUR signal, in accordance with some embodiments.

FIG. 5 is a graphical representation 500 of generation of a modulated LP-WUR signal. As shown in FIG. 5, the modulated LP-WUR signal 520 is obtained by modulating the LP-WUR bit sequence 510 with the generated WUR pulse (p_wur of Equation 6). Where the LP-WUR bit sequence 510 is set to 1, the modulated LP-WUR signal 520 includes LP-WUR pulses with one symbol duration 530.

The OFDMA signal is generated by assuming 26 tone OFDMA frequency signal is x, and the time domain OFDMA signal can be obtained by using a 256 point IFFT.

In Equation 7, x_OFDMA1 is the time domain OFDMA signal without CP. The CP is added according to Equation 8, where 64 is the CP length of an OFDMA symbol.

$$x\_OFDMA1 = IFFT(x, 256) \qquad \text{Equation 7}$$

$$x\_OFDMA = [x\_OFDMA1(256-64+1:256), x\_OFDMA1] \qquad \text{Equation 8}$$

Figure 6:
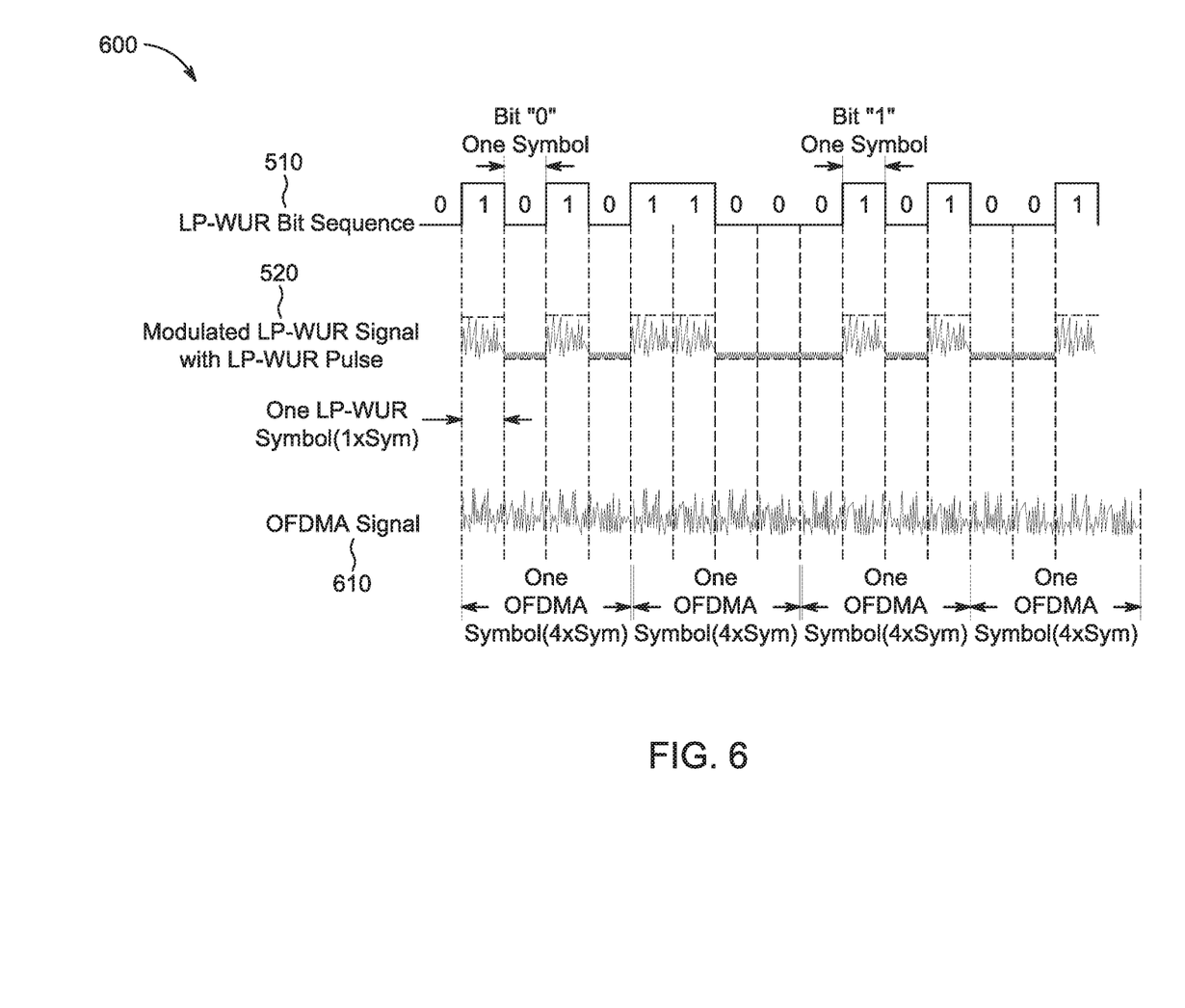
FIG. 6 is a graphical representation of signals to be multiplexed, in accordance with some embodiments.

The LP-WUR signal is multiplexed with the OFDMA signal. FIG. 6 is a graphical representation 600 of signals to be multiplexed. As shown in FIG. 6, the modulated LP-WUR signal 520, which is generated from the LP-WUR bit sequence 510, is multiplexed with the OFDMA signal 610 by adding the modulated LP-WUR signal 520 and the ODFMA signal 610 in the time domain. In each OFDMA symbol (which occupies 4×Sym), the OFDMA signal (which occupies 4×Sym) is multiplexed with four LP-WUR symbols (each of which occupies 1×Sym).

According to some examples, the bandwidth of the LP-WUR signal is (7/64)*20 MHz=2.1875 MHz. The bandwidth of the 26 tone OFDMA signal is (26/256)*20 MHz=2.0315 MHz.

Figure 7:
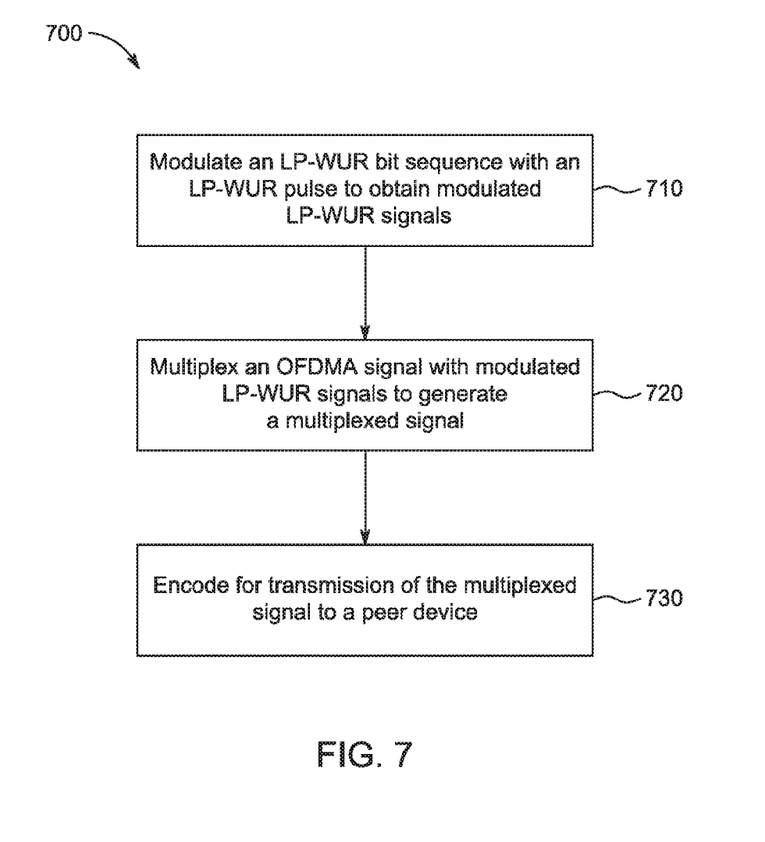
FIG. 7 is a flow chart of an example method for generating a multiplexed signal for a low-power wake-up packet, in accordance with some embodiments.

FIG. 7 is a flow chart of an example method 700 for generating a multiplexed signal for a low-power wake-up packet. According to some aspects, the method 700 is implemented at a wireless device.

At operation 710, the wireless device modulates an LP-WUR bit sequence with an LP-WUR pulse to obtain a plurality of modulated LP-WUR signals. Each modulated LP-WUR signal has a 1× symbol duration.

At operation 720, the wireless device multiplexes, in a time domain, an OFDMA signal with a 4× symbol duration with four modulated LP-WUR signals, to generate a multiplexed signal.

At operation 730, the wireless device encodes for transmission of the multiplexed signal to a peer device to wake up a WLAN radio of the peer device. The multiplexed signal is also transmitted to another device capable of reading OFDMA signals. The multiplexed signal includes an OFDMA-based Wi-Fi signal for another device.

Aspects of the subject technology are described below using various examples.

1. An apparatus of a wireless device, the apparatus comprising:
  memory, and processing circuitry, the processing circuitry to:
  modulate an LP-WUR (low-power wake-up radio) bit sequence with an LP-WUR pulse to obtain a plurality of modulated LP-WUR signals, each modulated LP-WUR signal having a 1× symbol duration;
  multiplex, in a time domain, an OFDMA (orthogonal frequency division multiple access) signal with a 4× symbol duration with four modulated LP-WUR signals, to generate a multiplexed signal; and
  encode for transmission of the multiplexed signal to a peer device to wake up a WLAN (wireless local area network) radio of the peer device and to another device with an OFDMA signal.

2. The apparatus of Example 1, wherein the LP-WUR pulse is based on IEEE (Institute of Electrical and Electronics Engineers) 802.11a STF (short training field) with zero tones removed.

3. The apparatus of Example 1, wherein the LP-WUR pulse is computed using a modified STF (short training field) based on a scaling factor ($\alpha$), the modified STF (s_ax) being defined according to an equation:

$$s\_ax = \alpha * [-1-1i, -1-1i, 1+1i, 0, -1-1i, -1-1i, 1+1i].$$

4. The apparatus of Example 3, wherein $\alpha$=sqrt (13/6).

5. The apparatus of Example 1, wherein the OFDMA signal is generated based on P/S (parallel to serial) conversion applied to an 11ax OFDMA signal.

6. The apparatus of Example 5, wherein the OFDMA signal is generated using a 256 point IFFT, and wherein a CP (cyclic prefix) is added to the OFDMA signal after the 256 point IFFT and before the P/S conversion.

7. The apparatus of Example 1, wherein the processing circuitry is further to:
  apply, to the multiplexed signal, prior to encoding the multiplexed signal for transmission, point-to-point multiplication with a window function to reduce out of band emission (OOBE) of the multiplexed signal, the window function being configured to reduce interference to other OFDMA signals.

8. The apparatus of Example 1, further comprising a radio to transmit the multiplexed signal to the peer device.

9. A non-transitory machine-readable medium storing instructions for execution by processing circuitry of a wireless device, the instructions causing the processing circuitry to:
  modulate an LP-WUR (low-power wake-up radio) bit sequence with an LP-WUR pulse to obtain a plurality of modulated LP-WUR signals, each modulated LP-WUR signal having a 1× symbol duration;
  multiplex, in a time domain, an OFDMA (orthogonal frequency division multiple access) signal with a 4× symbol duration with four modulated LP-WUR signals, to generate a multiplexed signal; and
  encode for transmission of the multiplexed signal to a peer device to wake up a WLAN (wireless local area network) radio of the peer device and to another device with an OFDMA signal.

10. The machine-readable medium of Example 9, wherein the LP-WUR pulse is based on IEEE (Institute of Electrical and Electronics Engineers) 802.11a STF (short training field) with zero tones removed.

11. The machine-readable medium of Example 9, wherein the LP-WUR pulse is computed using a modified STF (short training field) based on a scaling factor (a), the modified STF (s_ax) being defined according to an equation:

$$s\_ax = \alpha * [-1-1i, -1-1i, 1+1i, 0, -1-1i, -1-1i, 1+1i].$$

12. The machine-readable medium of Example 11, wherein $\alpha$=sqrt (13/6).

13. The machine-readable medium of Example 9, wherein the OFDMA signal is generated based on P/S (parallel to serial) conversion applied to an 11ax OFDMA signal.

14. The machine-readable medium of Example 13, wherein the OFDMA signal is generated using a 256 point IFFT, and wherein a CP (cyclic prefix) is added to the OFDMA signal after the 256 point IFFT and before the P/S conversion.

15. The machine-readable medium of Example 9, the instructions further causing the processing circuitry to:
  apply, to the multiplexed signal, prior to encoding the multiplexed signal for transmission, point-to-point multiplication with a window function to reduce out of band emission (OOBE) of the multiplexed signal, the window function being configured to reduce interference with other OFDMA signals.

16. A method, implemented at a wireless device, the method comprising:
  modulating an LP-WUR (low-power wake-up radio) bit sequence with an LP-WUR pulse to obtain a plurality of modulated LP-WUR signals, each modulated LP-WUR signal having a 1× symbol duration;

multiplexing, in a time domain, an OFDMA (orthogonal frequency division multiple access) signal with a 4× symbol duration with four modulated LP-WUR signals, to generate a multiplexed signal; and encoding for transmission of the multiplexed signal to a peer device to wake up a WLAN (wireless local area network) radio of the peer device.

17. The method of Example 16, wherein the LP-WUR pulse is based on IEEE (Institute of Electrical and Electronics Engineers) 802.11a STF (short training field) with zero tones removed.

18. The method of Example 16, wherein the LP-WUR pulse is computed using a modified STF (short training field) based on a scaling factor ($\alpha$), the modified STF (s_ax) being defined according to an equation:

$$s\_ax=\alpha*[-1-1i,-1-1i,1+1i,0,-1-1i,-1-1i,1+1i].$$

19. The method of Example 16, wherein the OFDMA signal is generated based on P/S (parallel to serial) conversion applied to 11ax frequency domain symbols.

20. The method of Example 19, wherein the OFDMA signal is generated using a 256 point IFFT, and wherein a CP (cyclic prefix) is added to the OFDMA signal after the 256 point IFFT and before the P/S conversion.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device, the apparatus comprising:

memory; and processing circuitry, the processing circuitry to:

modulate an LP-WUR (low-power wake-up radio) bit sequence with an LP-WUR pulse to obtain a plurality of modulated LP-WUR signals, each modulated LP-WUR signal having a 1× symbol duration;

multiplex, in a time domain, an OFDMA (orthogonal frequency division multiple access) signal with a 4× symbol duration with four modulated LP-WUR signals, to generate a multiplexed signal; and encode for transmission of the multiplexed signal to a peer device to wake up a WLAN (wireless local area network) radio of the peer device and to another device with an OFDMA signal.

2. The apparatus of claim 1, wherein the LP-WUR pulse is based on IEEE (Institute of Electrical and Electronics Engineers) 802.11a STF (short training field) with zero tones removed.

3. The apparatus of claim 1, wherein the LP-WUR pulse is computed using a modified STF (short training field) based on a scaling factor ($\alpha$), the modified STF (s_ax) being defined according to an equation:

$$s\_ax=\alpha*[-1-1i,-1-1i,1+1i,0,-1-1i,-1-1i,1+1i].$$

4. The apparatus of claim 3, wherein $\alpha$=sqrt (13/6).

5. The apparatus of claim 1, wherein the OFDMA signal is generated based on P/S (parallel to serial) conversion applied to an 11ax OFDMA signal.

6. The apparatus of claim 5, wherein the OFDMA signal is generated using a 256 point IFFT, and wherein a CP (cyclic prefix) is added to the OFDMA signal after the 256 point IFFT and before the P/S conversion.

7. The apparatus of claim 1, wherein the processing circuitry is further to:

apply, to the multiplexed signal, prior to encoding the multiplexed signal for transmission, point-to-point multiplication with a window function to reduce out of band emission (OOBE) of the multiplexed signal, the window function being configured to reduce interference to other OFDMA signals.

8. The apparatus of claim 1, further comprising a radio to transmit the multiplexed signal to the peer device.

9. A non-transitory machine-readable medium storing instructions for execution by processing circuitry of a wireless device, the instructions causing the processing circuitry to:

modulate an LP-WUR (low-power wake-up radio) bit sequence with an LP-WUR pulse to obtain a plurality of modulated LP-WUR signals, each modulated LP-WUR signal having a 1× symbol duration;

multiplex, in a time domain, an OFDMA (orthogonal frequency division multiple access) signal with a 4× symbol duration with four modulated LP-WUR signals, to generate a multiplexed signal; and encode for transmission of the multiplexed signal to a peer device to wake up a WLAN (wireless local area network) radio of the peer device and to another device with an OFDMA signal.

10. The machine-readable medium of claim 9, wherein the LP-WUR pulse is based on IEEE (Institute of Electrical and Electronics Engineers) 802.11a STF (short training field) with zero tones removed.

11. The machine-readable medium of claim 9, wherein the LP-WUR pulse is computed using a modified STF (short training field) based on a scaling factor ($\alpha$), the modified STF (s_ax) being defined according to an equation:

$$s\_ax=\alpha*[-1-1i,-1-1i,1+1i,0,-1-1i,-1-1i,1+1i].$$

12. The machine-readable medium of claim 11, wherein $\alpha$=sqrt (13/6).

13. The machine-readable medium of claim 9, wherein the OFDMA signal is generated based on P/S (parallel to serial) conversion applied to an 11ax OFDMA signal.

14. The machine-readable medium of claim 13, wherein the OFDMA signal is generated using a 256 point IFFT, and wherein a CP (cyclic prefix) is added to the OFDMA signal after the 256 point IFFT and before the P/S conversion.

15. The machine-readable medium of claim 9, the instructions further causing the processing circuitry to:

apply, to the multiplexed signal, prior to encoding the multiplexed signal for transmission, point-to-point multiplication with a window function to reduce out of band emission (OOBE) of the multiplexed signal, the window function being configured to reduce interference with other OFDMA signals.

16. A method, implemented at a wireless device, the method comprising:

modulating an LP-WUR (low-power wake-up radio) bit sequence with an LP-WUR pulse to obtain a plurality of modulated LP-WUR signals, each modulated LP-WUR signal having a 1× symbol duration;

multiplexing, in a time domain, an OFDMA (orthogonal frequency division multiple access) signal with a 4× symbol duration with four modulated LP-WUR signals, to generate a multiplexed signal; and encoding for transmission of the multiplexed signal to a peer device to wake up a WLAN (wireless local area network) radio of the peer device.

17. The method of claim 16, wherein the LP-WUR pulse is based on IEEE (Institute of Electrical and Electronics Engineers) 802.11a STF (short training field) with zero tones removed.

18. The method of claim 16, wherein the LP-WUR pulse is computed using a modified STF (short training field) based on a scaling factor ($\alpha$), the modified STF (s_ax) being defined according to an equation:

$$s\_ax = \alpha * [-1-1i, -1-1i, 1+1i, 0, -1-1i, -1-1i, 1+1i].$$

19. The method of claim 16, wherein the OFDMA signal is generated based on P/S (parallel to serial) conversion applied to 11ax frequency domain symbols.

20. The method of claim 19, wherein the OFDMA signal is generated using a 256 point IFFT, and wherein a CP (cyclic prefix) is added to the OFDMA signal after the 256 point IFFT and before the P/S conversion.

* * * * *